Figure 1:
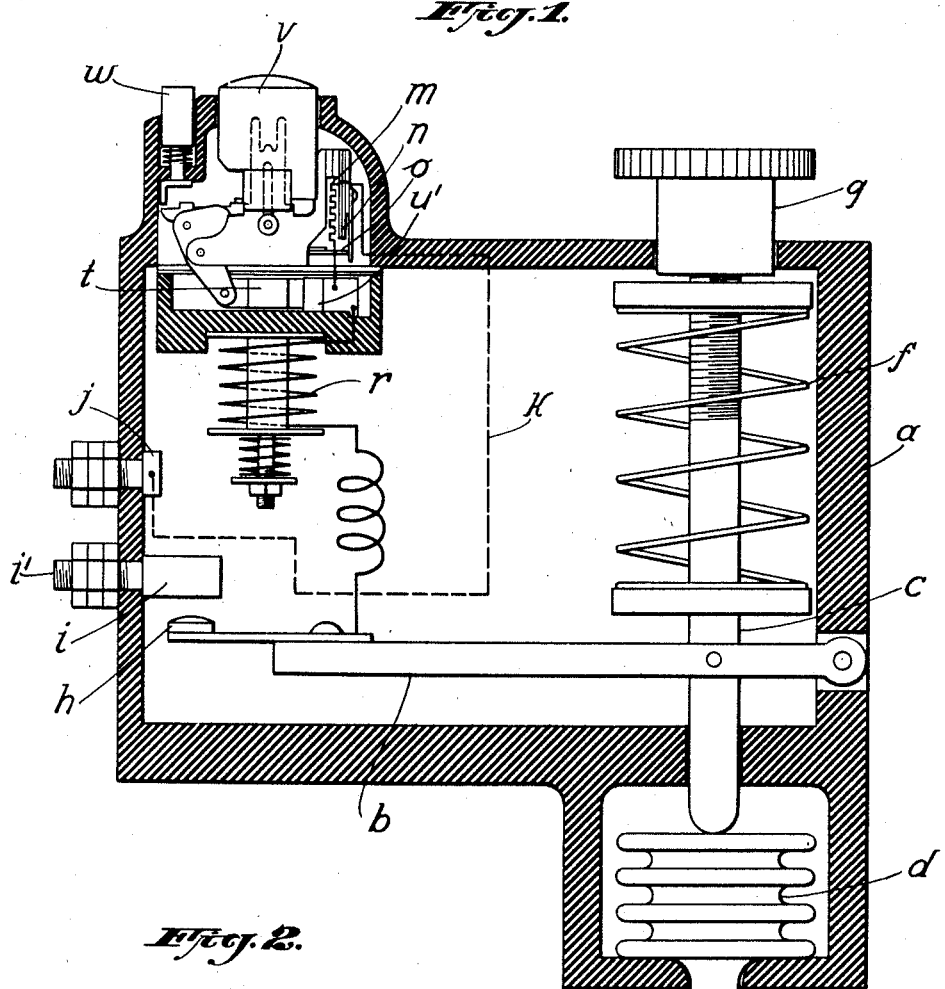

Nov. 17, 1942.  G. RECHEL  2,302,348

CONTROL UNIT FOR TEMPERATURE REGULATION

Filed June 14, 1939

INVENTOR.

GEORG RECHEL.

BY Knight Brothers

ATTORNEYS

Patented Nov. 17, 1942

2,302,348

UNITED STATES PATENT OFFICE 2,302,348

CONTROL UNIT FOR TEMPERATURE REGULATION

Georg Rechel, Heidelberg, Germany; vested in the Alien Property Custodian

Application June 14, 1939, Serial No. 279,062
In Germany June 11, 1938

2 Claims. (Cl. 62—4)

The invention relates to a control unit for regulating the temperature in refrigerating, room heating or other temperature conditioning systems, which serves to control a current-consuming apparatus affecting the temperature to be regulated. A known type of thermostatic control switch for temperature-regulating purposes contains a capsule filled with a highly evaporative liquid. The capsule is connected with a temperature feeler, for instance by means of a capillary conduit, and acts on an electric contact against the force of a return spring. If the temperature at the feeler increases, the gas pressure in the capsule also increases, and the expanding capsule overcomes the counter-force of the spring and opens the circuit of the current-consuming apparatus. If the temperature to be controlled decreases, the gas pressure also decreases, so that the capsule contracts and allows the return spring to re-close the circuit. Dependent upon the particular use to which the thermostatic switch is put, the arrangement may also operate in the opposite way so that a circuit is closed when the temperature increases, and opened when the temperature drops. The above-mentioned thermostatic switches are used for regulating the temperature in railroad cars or compartments in which case the current-consuming apparatus to be controlled consist of electric radiators. Another known use of these switches is for the temperature regulation in refrigerators where the apparatus to be controlled consists of the driving motor of a compressor unit. Switches of the above-mentioned type are further applicable in various other temperature-regulating systems, for instance in air conditioners and incubators.

Since the thermostatic switch operates exclusively in dependence upon changes of temperature, it is also necessary to provide additional means for protecting the current-consuming apparatus, for instance the electric radiator or motor, against overload currents. To this end, the thermostatic switches, especially those for refrigerators, have been provided with a current-responsive element consisting, for instance, of a bimetallic strip. This bimetallic strip is, as a rule, so rated that it protects the motor against overloads which are more than about 8 to 10 times higher than the rated current intensity of the motor. This rating of the strip is based on the increase in current intensity which is to be expected in cases where the normal operation of the motor is disturbed, for instance if the bearings of the motor or compressor of the refrigerator are clogged and act as a brake, or if the motor does not properly start for some other reason. Since, accordingly, the bimetallic strip or any other thermostatic device employed for the just-mentioned purpose does not protect the motor against relatively low but long-lasting overloads, the application of an additional, more finely adjusted safety means is, as a rule, desirable. The particular conditions existing in temperature-controlling systems of the type here referred to, render a satisfactory application of such fine protection difficult. The motor of a refrigerator, for instance, has in general a rated current intensity of about 1 amp. As a rule, however, this refrigerator is connected to an ordinary residential wiring system whose fuses or cut-out breakers are rated for a much higher normal current intensity, for instance of 15 or at least 6 amps. As a result, a refrigerator having a driving motor provided with the above-mentioned thermostatic devices is not protected against persistent overloads of for instance 1.2 amps. because the bimetallic strip of the thermostatic control and the fuse plug or cut-out switch of the wiring system do not respond to such slight overloads. On the other hand, if one would attempt to design the bimetallic strip of the thermostatic control as a finely adjusted element so that it responds to a persistent overload of for instance 1.2 amps., this bimetallic strip would be destroyed by short circuits or even by overloads of only 3 or 5 or 10 amps. for example.

The aforedescribed protective means, therefore, are inadequate to ensure perfect protection of a current-consuming and thermostatically-controlled apparatus of the type here dealt with, which means that a satisfactory operation cannot be obtained during an extended period unless the consuming apparatus is over-rated and accordingly the entire construction heavier and more expensive, and the range of temperature regulation broader than would be necessary if a more accurately operating control were obtained.

It has been attempted to adapt the control means better to the actual thermal conditions of the consuming apparatus of heat-conditioning systems by providing an additional fuse plug or overload breaker in the feeding circuit leading to a refrigerator, or rather in the connection box wherein the feeding leads branch from the main wiring system. In refrigerators or other apparatus of the transportable type, having a plug -coupling, the additional finely-adjusted fuse plug or breaker can be arranged in the stationary receptacle containing the sockets of the plug coupling. Expedients of such kind also fail to afford a satisfactory protection and render the arrangement intricate and expensive. In cases where an additional fuse is mounted in the stationary portion of a connection box to which the refrigerator is connected by means of a detachable coupling, the protection is lost if such refrigerator is plugged into another receptacle.

An object of the present invention is to provide a thermostatic control unit for current-consuming apparatus affecting the temperature in a cold or heat-producing system, which eliminates the above-explained difficulties and thereby affords a finer control and better protection of the apparatus as well as the possibility of doing away with over-size constructions.

According to the invention, a thermostatic control device of the aforementioned kind is provided with three different elements combined into one unit which as a whole is insertable in or attachable to the refrigerator or other current-consuming and temperature-affecting apparatus to be controlled. The three united elements consist of a thermostatic switch operating in response to the temperature to be regulated, a second thermostatic means, such as a bimetallic strip, which is finely adjusted to the characteristic of the current-consuming apparatus, and an electromagnetic device responsive to heavy overloads which protects the second thermostatic means against damage by heavy overloads and short circuits. The thermostatic switch contains an expansive capsule which acts on a make and break contact against the force of a return spring and serves to open and close the circuit of the current-consuming apparatus so as to maintain the temperature to be regulated at a constant value or within given limits. The second thermostatic element in the form of a bimetallic strip, heating wire or heating rod is so designed that it responds to small overloads if they persist during such a long period that the overload would be detrimental to the apparatus. In other words, the time lag and the thermal characteristic of the second element are similar to the thermal characteristic of the apparatus to be controlled. The electromagnetic device is designed as a quick-acting tripping mechanism and has its magnetic structure adapted to the rating and time constant of the finely adjusted thermostatic element so as to prevent the latter from being damaged by overloads of high intensity.

Figure 2:
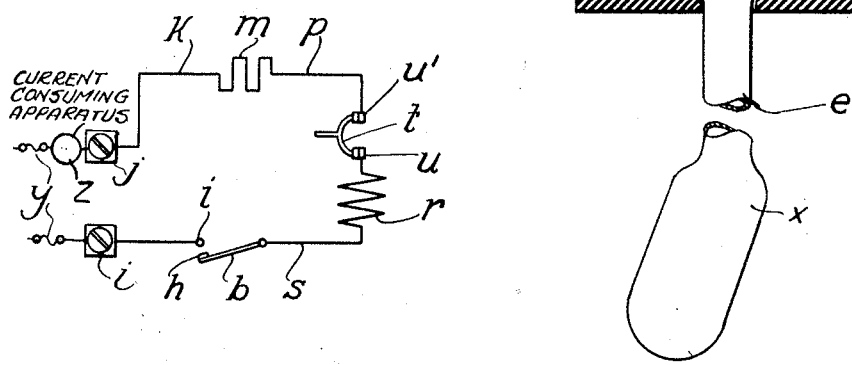

A control unit according to the invention is exemplified by the sectional view illustrated in Fig. 1 of the drawing. Fig. 2 shows the wiring diagram of the same unit.

According to the drawing, a container $a$ is provided with a contact lever $b$ which is acted upon by a movable rod $c$ abutting against a capsule $d$. The capsule is filled with gas or a highly evaporative liquid and connected with a temperature feeler $x$ by means of a capillary tube $e$. The rod $c$ is also acted upon by a return spring $f$ whose tension is adjustable by means of a screw $g$.

The lever $b$ carries a contact $h$ which cooperates with a stationary countercontact $i$ attached to the container $a$ and provided with a terminal $i'$. A second terminal $j$ is connected by means of a conductor $k$ with one end of a heating element $m$ serving to heat a bimetallic strip $n$ of a switching mechanism having two stationary contacts $u$ and $u'$ (see Fig. 2) which in contact-closing position are bridged by a movable contact $t$. The switching mechanism has a tripping member $o$ which is controlled by the bimetallic strip $n$. The heating element $m$ is electrically connected with contact $u'$ through conductor $p$ (Fig. 2), while the other stationary contact $u$ is connected with a magnetic tripping coil $r$ whose other pole is connected through conductor $s$ with the movable contact $h$ of contact lever $b$. The electromagnet $r$ is so rated that it responds quickly to overloads of short-circuit character and then effects an immediate tripping of the switching mechanism which causes the contact bridge $t$ to open the circuit.

The control unit operates as follows: The terminals $i'$ and $j$ are connected in series with the current-consuming apparatus $z$ to be controlled. For instance, one conductor may lead from a contact plug to a transportable refrigerator, conditioning unit or heater $z$ and from thence to the terminal $i'$ of the control unit illustrated in the drawing, while the second conductor leads from terminal $j$ immediately to the contact plug. If such a transportable apparatus is plugged into any socket of an ordinary wiring system, having, as customary, a set of fuse plugs $y$ or the like means for protecting the installation against heavy overloads and short circuits, the apparatus $z$ is fully protected against any possible anomalies of load or temperature. In the position of lever $b$, shown in Fig. 1, the circuit is interrupted so that the motor-compressor unit of a refrigerator for instance is not yet in operation. If the temperature in the cooling chamber increases, the gas pressure within capsule $d$ also increases so that the capsule expands and moves the rod $c$ and the lever $b$ in upward direction until the contact $h$ engages the stationary contact $i$ and thereby sets the motor $z$ in operation which causes the temperature of the cooling chamber to decrease. So far, the operation of the control unit does not differ from known devices.

If, now, during the operating period of the motor an overload occurs which does not have the character of a short circuit but may lead to damage if it persists throughout an extended period, the finely adjusted thermostat $n$ gradually bends and after a certain time releases the tripping member $o$ so that the switching mechanism moves the contact bridge $t$ into contact-opening position. The bimetallic strip $n$ is so dimensioned that its thermal characteristic is adapted to that of the motor and that the tripping occurs with a time lag dependent upon the current intensity. However, if during the operation of the motor an overload of such high intensity occurs that the finely adjusted strip $n$ is endangered, the electromagnet $r$ responds immediately and opens the circuit between contacts $u$, $u'$ and $t$. While the contacts $h$ and $i$ are make and break contacts and automatically open and close in response to an upper and lower limit of the temperature to be regulated, the contacts $u$, $u'$ and $t$ form part of a cut-out breaker. As an effect of the opening movement of contact bridge $t$, the re-setting knob $v$ moves outwardly. In order to re-set the breaker into contact-closing position, the knob $v$ is to be pushed. The embodiment exemplified in the drawing has a second knob $w$ which allows tripping the breaker by hand. This has the additional advantage that the unit may also serve as a manually-operated main switch for setting the refrigerator or other apparatus in and out of operation at will.

As to the dimensioning of the bimetallic strip and the electromagnetic device, the following example is illustrative. Suppose the motor of a refrigerator is rated for a normal intensity of 1 amp. The bimetallic strip may be so rated that it interrupts the circuit at an overload of 1.2 amps. if persistent throughout a certain time. If the motor is so dimensioned that it cannot withstand an overload of 1.3 amps. longer than one minute without being impaired, the characteristic of the bimetallic strip must be so chosen that at 1.3 amps. the opening of the breaker occurs after less than one minute. A bimetallic strip of such time constant is relatively thin and would burn out if exposed to a heavy overload. This does not occur, however, because the occurrence of such overloads causes the electromagnetic device to interrupt the circuit instantaneously. If for instance, the bimetallic strip is not capable of withstanding a load of 2 amps., the electromagnetic device must be so adjusted that a current of only 2 amps. suffices to effect the instantaneous interruption of the circuit. By "heavy overloads" therefore is to be understood such a load which would damage the bimetallic strip, although this load may be relatively low if compared with the conventional rating of fuses or overload breakers of residential wiring systems. The control unit according to the invention may be so adapted, if desired, that in cases of still higher overloads, for instance over 10 or 20 amps., the main fuse or main breaker y of the residential wiring system, for instance the fuse in the connection box of an apartment or house, blows out before the control unit of the refrigerator comes into operation. If a control unit according to the invention is inserted into a refrigerating or other apparatus, the apparatus may be connected in any manner to a wiring system regardless of the fact that the motor or current-consuming part of the apparatus has a rated amperage much lower than that of the fuses or breakers y of the wiring system. The control unit has the further advantage that it does not require more space than and may be mounted in the same manner as the known thermostatic controls of refrigerators, and that its construction is simple and inexpensive.

I claim:

1. A device for controlling refrigerating, room heating and conditioning and the like apparatus in wiring systems having cut-out means for protection from overloads and short circuits, which comprises in combination a thermostatic switch disposed in the circuit of said apparatus and having actuating means responsive to variations of the temperature to be regulated, a second switch series-connected with said first switch, said second switch having a thermostatic tripping element connected with the circuit of said current-consuming apparatus and being closely adapted to the characteristic of said apparatus so as to cause tripping of said second switch in response to a persisting low overload exceeding the rated load of said apparatus by a fraction of said rated load, quick-acting electromagnetic means also connected with said circuit for interrupting said circuit independent of said thermostatic tripping element, said electromagnetic means being adapted to the characteristic of said thermostatic tripping element so as to respond to higher overloads injurious to said thermostatic tripping element yet below the limit of response of the cut-out means of the wiring system, and a common receptacle containing said switches, said thermostatic tripping element, and said electromagnetic means so as to form a single control unit.

2. A device for controlling refrigerating, room heating and conditioning and the like apparatus in wiring systems having cut-out means for protection from overloads and short circuits, which comprises in combination a thermostatic switch arranged in series connection in the circuit of said apparatus and having make and break contacts and actuating means for operating said contacts, a circuit breaker series-connected in said circuit having a finely adjusted thermostatic tripping element and a coarsely adjusted electromagnetic tripping element for controlling said breaker independently from each other, said two tripping elements being both also connected in series relation to said circuit, said thermostatic element being adapted to the current characteristic of said apparatus so as to cause tripping of said breaker in response to a persisting low overload exceeding the rated load of said apparatus by a fraction of said rated load, said electromagnetic element being adapted to said thermostatic tripping element so as to respond to higher overloads injurious to said thermostatic tripping element yet below the limit of response of the cut-out means of the wiring system, and common supporting means carrying said switch, said breaker, and said tripping elements so as to form a single control unit.

GEORG RECHEL.